US011075776B2

(12) United States Patent
Balraj et al.

(10) Patent No.: US 11,075,776 B2
(45) Date of Patent: Jul. 27, 2021

(54) SYSTEMS AND METHODS FOR INDOOR TRACKING VIA WI-FI FINGERPRINTING AND ELECTROMAGNETIC FINGERPRINTING

(71) Applicant: Honeywell International Inc., Morristown, NJ (US)

(72) Inventors: KamalaKannan Balraj, Madurai (IN); Sunil Venugopalan, Bangalore (IN); SivaKumar Balla, Madurai (IN); Ramkumar Rajendran, Madurai (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/006,049

(22) Filed: Jun. 12, 2018

(65) Prior Publication Data
US 2018/0359113 A1 Dec. 13, 2018

Related U.S. Application Data

(60) Provisional application No. 62/518,763, filed on Jun. 13, 2017.

(51) Int. Cl.
*H04L 12/28* (2006.01)
*H04W 4/33* (2018.01)
(Continued)

(52) U.S. Cl.
CPC ........ *H04L 12/2829* (2013.01); *G01S 5/0252* (2013.01); *G01S 11/06* (2013.01);
(Continued)

(58) Field of Classification Search
CPC .......... H04W 12/08; H04W 12/00503; H04W 12/12; H04W 12/06; H04W 4/027;
(Continued)

(56) References Cited

U.S. PATENT DOCUMENTS 9,341,700 B2  5/2016  Amir et al.
2012/0072106 A1  3/2012  Han et al.
(Continued)

FOREIGN PATENT DOCUMENTS

AU  2013100137 A4  2/2013
CN  105934684 A  9/2016

*Primary Examiner* — Ajibola A Akinyemi
(74) *Attorney, Agent, or Firm* — Seager, Tufte & Wickhem, LLP

(57) ABSTRACT

Systems and methods for indoor tracking via Wi-Fi fingerprinting and electromagnetic fingerprinting are provided and can include a gateway receiver device measuring a RSSI value of a signal transmitted by a Wi-Fi transmitter device, the gateway receiver device measuring an EMF value of an interference in an electromagnetic field created by the gateway receiver device that is caused by the Wi-Fi transmitter device, the gateway receiver device determining whether the RSSI value matches any of a plurality of Wi-Fi fingerprints associated with a monitored region and whether the EMF value matches any of a plurality of electromagnetic fingerprints associated with the monitored region, and responsive thereto, the gateway receiver device identifying that a location of the Wi-Fi transmitter device is within the monitored region.

20 Claims, 1 Drawing Sheet

(51) Int. Cl.
    *H04W 64/00*     (2009.01)
    *G01S 11/06*     (2006.01)
    *H04W 4/02*     (2018.01)
    *G01S 5/02*     (2010.01)

(52) U.S. Cl.
    CPC ............ *H04W 4/023* (2013.01); *H04W 4/33* (2018.02); *H04W 64/003* (2013.01)

(58) Field of Classification Search
    CPC ......... H04W 4/90; H04W 4/80; H04W 4/021; H04W 4/70; H04W 72/0406; H04W 72/0453; H04W 88/06; H04W 12/1208; H04W 12/10; H04W 24/08; H04W 4/029
    USPC ...................................................... 455/67.11
    See application file for complete search history.

(56) References Cited

U.S. PATENT DOCUMENTS

| | | | |
|---|---|---|---|
| 2012/0127980 A1* | 5/2012 | Quinn | H04W 8/005 370/338 |
| 2014/0018111 A1 | 1/2014 | Farley et al. | |
| 2014/0180627 A1 | 6/2014 | Naguib et al. | |
| 2015/0087331 A1 | 3/2015 | Yang et al. | |
| 2015/0348341 A1* | 12/2015 | Baxley | H04W 12/06 340/5.2 |
| 2016/0007270 A1* | 1/2016 | Maor | G01B 7/003 455/434 |
| 2016/0116290 A1 | 4/2016 | Haverinen et al. | |
| 2016/0359526 A1* | 12/2016 | Pellew | G01S 11/06 |
| 2017/0067982 A1 | 3/2017 | Pan et al. | |
| 2017/0118686 A1* | 4/2017 | Fang | H04W 36/0085 |
| 2017/0149486 A1* | 5/2017 | Hara | H04W 4/80 |
| 2018/0100664 A1* | 4/2018 | Keogh | F24F 11/62 |

\* cited by examiner

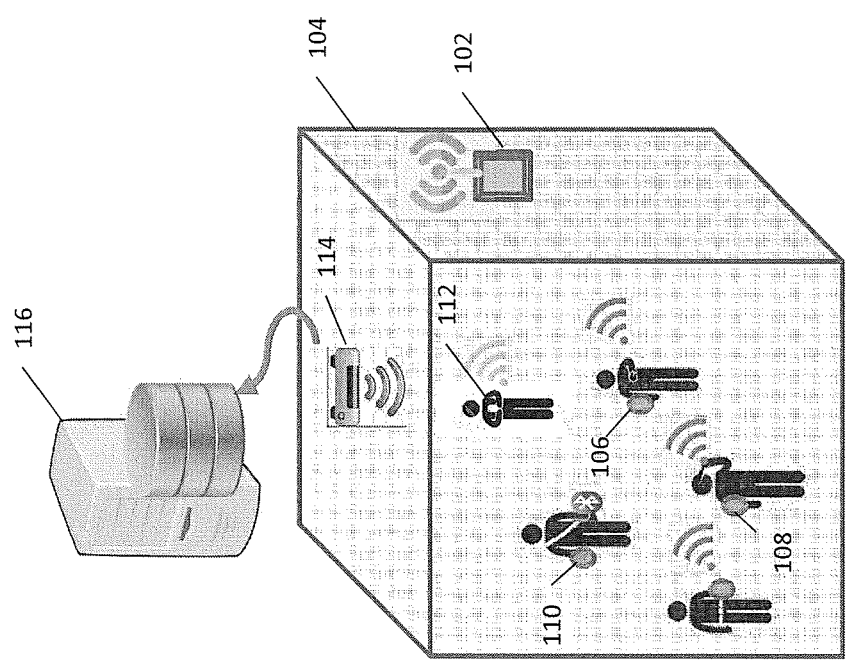

SYSTEMS AND METHODS FOR INDOOR TRACKING VIA WI-FI FINGERPRINTING AND ELECTROMAGNETIC FINGERPRINTING

CROSS-REFERENCE TO RELATED APPLICATIONS

This application claims priority to U.S. Provisional Patent Application No. 62/518,763 filed Jun. 13, 2017 and titled "Systems and Methods for Indoor Tracking Via a Wi-Fi Fingerprint and an Electromagnetic Fence." U.S. Application No. 62/518,763 is hereby incorporated by reference.

FIELD

The present invention relates to systems and methods for indoor tracking. More particularly, the present invention relates to systems and methods for indoor tracking via Wi-Fi fingerprinting and electromagnetic fingerprinting.

BACKGROUND

Indoor tracking systems and methods are known in the art and are based on RF fingerprints, transliteration, and time of arrival (TOA). However, known systems and methods are vulnerable to external interference, thereby resulting in inconsistent accuracy. For example, it is difficult to accurately track a position of a person or an object when RF signals are used and those RF signals overlap or encounter interference, such as iron materials, walls, or other objects that affect signal strength.

In view of the above, there is a continuing, ongoing need for improved systems and methods.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for indoor tracking via Wi-Fi fingerprinting and electromagnetic fingerprinting. For example, embodiments disclosed herein can include a hybrid methodology using both Wi-Fi fingerprinting and electromagnetic fingerprinting that can be used to track people or objects and that can be used in connection with any location-based service as would be known by one of skill in the art, for example, connecting and controlling internet of things (IoT) devices that are connected via Wi-Fi and that are part of a connected home, building, office, hospital, or commercial system.

In accordance with disclosed embodiments, systems and methods disclosed herein can include a gateway receiver device in a monitored region, and in some embodiments, the gateway receiver device can include a Wi-Fi transceiver and an electromagnetic object that can create an electromagnetic fence or field. For example, the gateway receiver device can use the Wi-Fi transceiver and a plurality of Wi-Fi devices placed at appropriate distances from the gateway receiver device at boundaries of the monitored region to measure and map a plurality of Wi-Fi fingerprints associated with the monitored region. Similarly, the gateway receiver device can use the electromagnetic object and a plurality of electromagnetic devices placed at appropriate distances from the gateway receiver device at boundaries of the monitored region to measure and map a plurality of electromagnetic fingerprints associated with the monitored region. Then, the gateway receiver device can store the plurality of Wi-Fi fingerprints and the plurality pf electromagnet fingerprints in a database device of a local or remote server device to generate a mapping table for the monitored region.

As disclosed herein, it is to be understood that a Wi-Fi fingerprint can include a received signal strength indicator (RSSI) value indicative of a power of a received radio signal, such as a Wi-Fi signal, from a Wi-Fi device and measured by the gateway receiver device. Furthermore, as disclosed herein, it is also to be understood that an electromagnetic fingerprint can include an electromagnetic fence or field (EMF) value indicative of interference in the electromagnetic fence or field (in Gauss units) caused by an electromagnetic device and measured by the gateway receiver device. In this regard, it is to be understood that the electromagnetic fence or field can describe a physical field produced by an electrically charged object that can affect the behavior of charged objects within a vicinity of the electromagnetic fence or field. The electromagnetic fence or field can extend throughout space and can describe the electromagnetic interaction of objects. In some embodiments, such vicinity field properties of the electromagnetic fence or field (i.e. the EMF value) can be used by systems and methods disclosed herein to avoid Wi-Fi signals overlapping and to avoid signal path loss issues, thereby overcoming the inconsistent accuracy issues of known systems and methods.

In accordance with disclosed embodiments, systems and methods disclosed herein can also include a Wi-Fi transmitter device, which can include or be a part of, for example, a wearable device worn by people or objects. When the Wi-Fi transmitter device is within a range of the gateway receiver device, the gateway receiver device can use the Wi-Fi transceiver to measure the RSSI value of a signal transmitted by the Wi-Fi transmitter device and can use the electromagnetic object to measure to measure the EMF value of the interference in the electromagnetic field or fence caused by the Wi-Fi transmitter. Then, the gateway receiver device can use such measured RSSI and EMF values to determine whether the Wi-Fi transmitter device is within the monitored region. For example, the gateway receiver device can transmit the measured RSSI and EMF values to the local or remote server device, which can compare the measured RSSI and EMF values to the plurality of Wi-Fi fingerprints and the plurality of electromagnetic fingerprints stored in the database and associated with the monitored region to determine whether the measured RSSI and EMF values match any of the plurality of Wi-Fi fingerprints and any of the plurality of electromagnetic fingerprints. In some embodiments, the gateway receiver device can use the measured RSSI and EMF values as disclosed to identify a location of the Wi-Fi transmitter within the monitored region.

In some embodiments, systems and methods disclosed herein can support connecting and controlling IoT devices. For example, a user can provide user input to the Wi-Fi transmitter device with instructions the gateway receiver device to adjust room temperature in an ambient room. Responsive thereto, the Wi-Fi transmitter device can transmit the signal to a central system of an HVAC system via the gateway receiver. The gateway receiver device in the ambient room can receive the signal from the Wi-Fi transmitter device, measure the RSSI and EMF values, and transmit such data to the server device. Then, the server device can use such received data as disclosed herein to identify a current location of the Wi-Fi transmitter device and, thus, the user, prior to authorizing the gateway receiver device and the HVAC system to adjust the room temperature as instructed.

FIG. 1 is a block diagram of a system 100 in accordance with disclosed embodiments. As shown in FIG. 1, the system 100 can include a gateway receiver device 102 in a zone, a room, or a monitored region 104. The system 100 can also include Wi-Fi transmitter devices 106-112 associated located in the zone, the room, or the monitored region 104. In some embodiments, some or all of the Wi-Fi transmitter devices 106-112 (e.g. the Wi-Fi transmitter devices 106 and 108) can include or be a part of a wearable device. Furthermore, in some embodiments, some or all of the Wi-Fi transmitter devices 106-112 (e.g. the Wi-Fi transmitter device 112) can include or be a part of a mobile device, such as a smartphone.

While the Wi-Fi transmitter devices 106-112 are described as wirelessly communicating with the gateway receiver device 102 via Wi-Fi (e.g. 802.11), it is to be understood that, additionally or alternatively, the Wi-Fi transmitter devices 106-112 can communicate with the gateway receiver module 102 via Bluetooth (BLE) or another wireless communication protocol. In these embodiments, the Wi-Fi transmitter devices 106-112 can be or include BLE transmitter devices or the like, and the gateway receiver device 102 can include a BLE-based transceiver.

The system 100 can also include a router 114 that connects to the Internet and facilitates the gateway receiver device 102 and the Wi-Fi transmitter devices 106-112 connecting with a server 116 via the Internet and the router 114. The server 116 can include a database that stores a plurality of Wi-Fi fingerprints associated with the zone, the room, or the monitored region 104 and a plurality of electromagnetic fingerprints associated with the zone, the room, or the monitored region 104.

Although not illustrated, it is to be understood that each of the gateway receiver device 102 and the server 116 can include control circuitry, which can include one or more programmable processors and executable control software as would be understood by one of ordinary skill in the art. The executable control software can be stored on a transitory or non-transitory computer readable medium, including, but not limited to local computer memory, RAM, optical storage media, magnetic storage media, and the like. In some embodiments, the control circuitry, the programmable processors, and the executable control software can execute and control some of the methods disclosed herein.

For example, the gateway receiver device 102 can measure a RSSI value of a signal transmitted by one of the Wi-Fi transmitter devices 106-112 and can measure an EMF value of interference in an electromagnetic fence or field created by the gateway receiver device 102 that is caused by the one of the Wi-Fi transmitter devices 106-112. Then, the gateway receiver device 102 can use such measured RSSI and EMF values to determine whether the one of the Wi-Fi transmitter devices 106-112 is within the zone, the room, or the monitored region 104. For example, the gateway receiver device 102 can transmit the measured RSSI and EMF values to the server 116, which can compare the measured RSSI and EMF values to the plurality of Wi-Fi fingerprints and the plurality of electromagnetic fingerprints stored in the database and associated with the monitored region to determine whether the measured RSSI and EMF values match any of the plurality of Wi-Fi fingerprints and any of the plurality of electromagnetic fingerprints and, if so, that the one of the transmitter devices 106-112 is within the zone, the room, or the monitored region 104.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method of tracking a location of one or more individuals relative to a monitored region corresponding to a building space, each of the one or more individuals associated with the monitored region and carrying a Wi-Fi transmitter, the method comprising:
   a gateway receiver measuring a RSSI value of a signal transmitted by a Wi-Fi transmitter carried by one of the one or more individuals;
   the gateway receiver measuring an EMF value of an interference that is caused by the Wi-Fi transmitter carried by the one of the one or more individuals in an electromagnetic field that is created by the gateway receiver;
   the gateway receiver determining whether the measured RSSI value matches any of a plurality of Wi-Fi fingerprints associated with the monitored region and also determining whether the EMF value matches any of a plurality of electromagnetic fingerprints associated with the monitored region; and
   when the RSSI value matches one of the plurality of Wi-Fi fingerprints associated with the monitored region and the EMF value matches one of the plurality of electromagnetic fingerprints associated with the monitored region, the gateway receiver identifying that the Wi-Fi transmitter carried by the one of the one or more individuals is within the monitored region and thus determine that the one of the one or more individuals is within the monitored region.

2. The method of claim 1 further comprising the gateway receiver using a Wi-Fi transceiver of the gateway receiver to measure the RSSI value.

3. The method of claim 1 further comprising:
   an electromagnetic object of the gateway receiver creating the electromagnetic field; and
   the gateway receiver using the electromagnetic object to measure the EMF value.

4. The method of claim 1 further comprising the gateway receiver transmitting the RSSI value and the EMF value to a server to determine whether the RSSI value matches any of the plurality of Wi-Fi fingerprints associated with the monitored region and whether the EMF value matches any of the plurality of electromagnetic fingerprints associated with the monitored region.

5. The method of claim 4 further comprising the server comparing the RSSI value to a plurality of Wi-Fi fingerprints associated with the monitored region and stored in a database on the server and comparing the EMF value to a plurality of electromagnetic fingerprints associated with the monitored region and stored in the database.

6. The method of claim 5 further comprising:
the gateway receiver measuring and mapping the plurality of Wi-Fi fingerprints and storing the plurality of Wi-Fi fingerprints in the database; and
the gateway receiver measuring and mapping the plurality of electromagnetic fingerprints and storing the plurality of electromagnetic fingerprints in the database.

7. The method of claim 1 further comprising:
the gateway receiver receiving a command from the Wi-Fi transmitter carried by the one of the one or more individuals for an IoT device connected to the gateway receiver; and
the gateway receiver instructing the IoT device to execute the command when the gateway receiver identifies the location of the Wi-Fi transmitter carried by the one of the one or more individuals as being within the monitored region.

8. The method of claim 7 wherein the IoT device is an HVAC system, and wherein the command includes instructions to raise or lower a temperature of the monitored region.

9. The method of claim 1 wherein the Wi-Fi transmitter is included in or a part of a wearable device or a mobile device.

10. The method of claim 9 wherein the Wi-Fi transmitter is included in or a part of a smartphone.

11. The method of claim 1 further comprising the gateway receiver using a BLE based transceiver of the gateway receiver to measure the RSSI value, wherein the Wi-Fi transmitter is or includes a BLE device.

12. The system of claim 11 wherein the gateway receiver is located within the monitored region.

13. A system for tracking a location of one or more individuals relative to a monitored region corresponding to a building space, each of the one or more individuals associated with the monitored region and carrying a Wi-Fi transmitter, the system comprising:
a Wi-Fi transceiver of a gateway receiver that measures a RSSI value of a signal transmitted by a Wi-Fi transmitter carried by one of the one or more individuals;
an electromagnetic object of the gateway receiver that creates an electromagnetic field and measures an EMF value of an interference that is caused by the Wi-Fi transmitter carried by one of the one or more individuals in the electromagnetic field that is created by the gateway receiver; and
a programmable processor of the gateway receiver that determines whether the RSSI value matches any of a plurality of Wi-Fi fingerprints associated with a monitored region and whether the EMF value matches any of a plurality of electromagnetic fingerprints associated with the monitored region,
wherein, when the RSSI value matches one of the plurality of Wi-Fi fingerprints associated with the monitored region and the EMF value matches one of the plurality of electromagnetic fingerprints associated with the monitored region, the programmable processor identifies that the Wi-Fi transmitter carried by one of the one or more individuals is within the monitored region and thus determine that the one of the one or more individuals is within the monitored region.

14. The system of claim 13 further comprising a second transceiver that transmits the RSSI value and the EMF value to a server to determine whether the RSSI value matches any of the plurality of Wi-Fi fingerprints associated with the monitored region and whether the EMF value matches any of the plurality of electromagnetic fingerprints associated with the monitored region.

15. The system of claim 14 further comprising the server, wherein the server compares the RSSI value to a plurality of Wi-Fi fingerprints associated with the monitored region and stored in a database on the server and compares the EMF value to a plurality of electromagnetic fingerprints associated with the monitored region and stored in the database.

16. The system of claim 15 wherein the Wi-Fi transceiver and the programmable processor measure and map the plurality of Wi-Fi fingerprints and store the plurality of Wi-Fi fingerprints in the database, and wherein the electromagnetic object and the programmable processor measure and map the plurality of electromagnetic fingerprints and store the plurality of electromagnetic fingerprints in the database.

17. The system of claim 13 wherein the Wi-Fi transceiver receives a command from the Wi-Fi transmitter carried by the one of the one or more individuals for an IoT device connected to the gateway receiver, and wherein the programmable processor instructs the IoT device to execute the command when the programmable processor identifies the location of the Wi-Fi transmitter carried by the one of the one or more individuals as being within the monitored region.

18. The system of claim 17 wherein the IoT device includes an HVAC system, and wherein the command includes instructions to raise or lower a temperature of the monitored region.

19. The system of claim 13 wherein the Wi-Fi transmitter is included in or a part of a wearable device or a mobile device.

20. The system of claim 19 wherein the Wi-Fi transmitter is included in or a part of a smartphone.

* * * * *